United States Patent [19]

Fernandez

[11] Patent Number: 4,855,725
[45] Date of Patent: Aug. 8, 1989

[54] MICROPROCESSOR BASED SIMULATED BOOK

[76] Inventor: Emilio A. Fernandez, 1019 Salt Meadow La., McLean, Va. 22101

[21] Appl. No.: 291,433

[22] Filed: Dec. 28, 1988

Related U.S. Application Data

[63] Continuation of Ser. No. 124,593, Nov. 24, 1987, abandoned.

[51] Int. Cl.$^4$ .............................................. G09G 1/00
[52] U.S. Cl. ...................................... 340/706; 40/365; 362/155; 358/194.1; 434/308; 434/317
[58] Field of Search .................. 341/23, 31; 340/706, 340/802; 40/365, 571; 362/98, 99, 155; 364/410; 358/254, 194.1; 434/178, 307, 308, 317, 323, 365

[56] References Cited

U.S. PATENT DOCUMENTS

| | | | |
|---|---|---|---|
| 3,744,150 | 7/1973 | Folson | 434/178 |
| 4,002,355 | 1/1977 | Sendor | 434/317 |
| 4,159,417 | 6/1979 | Rubincam | 434/178 |
| 4,189,852 | 2/1980 | Chatlien | 434/178 |
| 4,209,824 | 6/1980 | Kaufman | 362/98 |
| 4,302,193 | 11/1981 | Haynes | 434/308 |
| 4,359,222 | 11/1982 | Smith, III et al. | 340/706 |
| 4,360,345 | 11/1982 | Hon | 434/323 |
| 4,363,081 | 12/1982 | Wilbur | 362/98 |
| 4,397,635 | 8/1983 | Samuels | 434/178 |
| 4,490,810 | 12/1984 | Hon | 364/410 |
| 4,555,859 | 12/1985 | Corso | 434/308 |
| 4,589,659 | 5/1986 | Yokoi et al. | 40/365 |
| 4,639,225 | 1/1987 | Washizuka | 358/254 |
| 4,656,469 | 4/1987 | Oliver et al. | 340/802 |
| 4,680,681 | 7/1987 | Fisherman et al. | 362/99 |
| 4,712,105 | 12/1987 | Köhler | 358/194.1 |
| 4,733,485 | 3/1988 | Ozeki | 40/365 |
| 4,745,397 | 3/1988 | Langerbauer et al. | 340/365 VL |
| 4,755,883 | 7/1988 | Uehira | 358/194.1 |
| 4,914,275 | 12/1987 | Engel et al. | 434/178 |

FOREIGN PATENT DOCUMENTS

| | | | |
|---|---|---|---|
| 3036947 | 5/1982 | Fed. Rep. of Germany | 340/706 |
| 0129642 | 8/1983 | Japan | 340/706 |
| 1484250 | 9/1977 | United Kingdom | 434/308 |

Primary Examiner—David K. Moore
Assistant Examiner—M. Fatahiyar
Attorney, Agent, or Firm—Whitham and Marhoefer

[57] ABSTRACT

A user interactive mass storage data access system includes a personal computer (10) and a simulated book (30). A mass storage device, such as a compact disk (CD) read only memory (ROM) (22), is connected to the personal computer, and the computer and the simulated book are connected by an infrared (IR) data communications link including IR transceivers (26, 48). The simulated book includes a display screen (34) and a microprocessor (43) with memory (44, 46). The microprocessor is programmed for storing data received and decoded by its IR transceiver (48) in memory (46) and responsive to user input for displaying a page of data on the display screen. In addition, the microprocessor is programmed to cause its IR transceiver (48) to transmit to the IR transceiver (26) connected to the personal computer (10) a data request command, and the personal computer is in turn programmed to transmit data from the CD ROM (22) to the simulated book (30). Data can be loaded in the simulated book and accessed at a later time when out of the proximity of the personal computer.

15 Claims, 4 Drawing Sheets

MICROPROCESSOR BASED SIMULATED BOOK

CROSS-REFERENCE TO RELATED APPLICATION

This application is a continuation of application Ser. No. 07/124,593 filed Nov. 24, 1987, now abandoned.

BACKGROUND OF THE INVENTION

1. Field of the Invention

The present invention generally relates to portable electronic video display devices and, more particularly to a hand held, microprocessor based device which, when used in conjunction with a personal computer (PC) having a peripherally connected mass storage device, such as a compact disc (CD) read only memory (ROM) device, simulates a book.

2. Description of the Prior Art

Compact disc technology has gained wide acceptance in the art of digital audio recording and reproduction. More recently, compact discs have been used to store large quantities of digital data for access by personal computers. A single compact disc, for example, has the capacity to store a complete encyclopedia. Currently, there is avaliable on the market compact disc drives for connection to personal computers and the software for the control of the disc drives that make possible the very rapid random access of the data stored on a compact disc. One application on the market is a so-called desk set of reference books including a dictionary, thesaurus, and style manual recorded on compact disc for use as a writer's aid. In addition, a number of data bases, including Chemical Abstracts, are available on compact disc for off line searching using a personal computer.

The current applications for compact disc (CD) read only memories (ROMs) are both limited and expensive, and as long as the applications remain limited, the cost of the technology will remain high. In order to broaden significantly the appeal and use of CD ROMs, it is necessary to make the technology more user friendly and, in the process, make the use of the technology practical in more than library, archival and office applications. Only in this way will the true potential of this technology be realized.

Known in the prior art are various audio/visual educational systems which use video discs. For example, U.S. Pat. No. 4,490,810 to Hon discloses an automated instruction game and retrieval system that utilizes a video disc and disc player. The Hon system includes a user command response unit that includes a liquid crystal display (LCD). One feature of the Hon system is that several students can be taught at different rates or that several shoppers can be served by a single video disc at the same time.

In an earlier patent, U.S. Pat. No. 4,360,345, Hon discloses a health education system for teaching cardiopulmonary resuscitation (CPR). A student reads visual information and views graphic scenes while interacting with a doll that has multiple sensors. The system coaches the student to perform the action properly.

U S. Pat. No. 4,159,417 to Rubincam discloses an electronic book wherein the contents of a book or magazine are digitally encoded onto a memory which is insertable in the book. The encoded information may then be displayed on the screen of the device. A similar disclosure may be found in U.S. Pat. No. 4,639,225 to Washizuka which describes a portable audio/visual electronic apparatus with insertable memory units.

U.S. Pat. No. 4,656,469 to Oliver et al. discloses an activated child's book or greeting card which is powered by solar cells. U.S. Pat. No. 4,363,081 to Wilbur discloses examples of foldable, illuminated greeting cards wherein light emitting diodes (LEDs) are positioned on a printed circuit board to illuminate a message when the card is opened. U.S. Pat. No. 4,589,659 to Yokoi et al. shows a foldable LCD used for electronic game devices.

U.S. Pat. No. 4,302,193 to Haynes discloses a reading tutor device which coordinates the reading of textual material with an audio presentation. U.S. Pat. No. 4,359,222 to Smith et al. discloses a hand held electronic game playing device with replaceable cartridges and user operated switches which allow games to be played. U.S. Pat. No. 4,555,859 to Corso discloses a viewer for displaying information recorded on printed tape.

While the foregoing prior art generally describe various portable and/or educational type devices, some of which incorporate pluggable memory devices, none addresses the problem of providing a user friendly interface for the access of the very large databases potentially available on CD ROMs.

SUMMARY OF THE INVENTION

It is therefore an object of the present invention to provide the user of mass storage technology with the simplicity of the look and feel of a book while allowing access to a very large database.

According to the present invention, a device about the size and shape of a book is provided as the user interface for accessing a CD ROM database. The device simulates a book in look and feel and might, for example, be bound in leather or other book binding material and embossed with the user's name or a business name, depending on the specific application and end user. Because of its size, shape and feel, the device would be immediately accepted by a very large number of people, especially those with very limited or no exposure and training on computers.

The device is microprocessor driven and has a large, easily viewable screen on one surface. The device preferably has some flexibility to enhance its look and feel of a book, and a screen using, for example, LCD technology is used. The device is battery powered, and the battery may be rechargeable by means of a conventional recharger and/or by solar cells positioned adjacent or even below the screen. About the periphery of the device are a plurality of infrared (IR) emitting diodes and photocells to allow the device to communicate, without wires or cables, with a personal computer (PC) having a peripherally connected mass storage device, such as a CD ROM. The PC is in turn equipped with an IR transceiver, and the arrangement is such that a user of the device can be anywhere in a room and still have access to the data on the CD ROM via a limited number of switches on the device. The IR transmissions are omnidirectional, with radiation bouncing off the walls and ceiling of the room, so that the manner in which the device is held is not critical to the communications link. The switches on the device may be either soft or hard. What is meant by a "soft" switch is a displayable area on the screen which is a "touch" screen. In contrast, a hard switch would comprise a keypad for entering a page number, and perhaps some commands, and a tactile pad switch which can be stroked with a thumb or finger in a direction which can be sensed by the switch. The tactile pad switch may be sensitive to four directions in a manner analogous to a track ball, and is used to turn pages forward or back and scroll up and down on a page. It is desirable to display a complete page on the screen, in which case scrolling up and down would not be required.

The device, or CD book as it is referred to hereinafter, provides the user with the look and feel of a book while allowing access to a very large database on a CD. This not only makes searching such a database more acceptable to many people, but it also provides an encouragement to younger people to read. The CD book can be used in multiple units for purposes of presentations at meetings or, with a PC provided with a multitasking/multiuser operating system, allow several users to simultaneously access different portions of the database simultaneously. The CD book has several pages of memory so that it can be carried away from the PC, as for example on an airplane, and the pages, about twenty in number, can be displayed for later reading. Both character and bit mapped displays are supported so that graphics as well as text could be displayed.

While the invention is particularly described in terms of a CD book which allows access to large data bases on compact disks, it will be understood that the invention has application to any type of mass storage media, including fixed or removable magnetic disks, magnetic tape or the like. CD technology is currently the most promising form of high density mass storage technology and represents the best mode of practicing the invention; but those skilled in the art will appreciate that the art of mass storage is rapidly changing, and the invention could easily be used with other mass storage technologies not yet developed.

BRIEF DESCRIPTION OF THE DRAWINGS

The foregoing and other objects, aspects and advantages of the invention will be better understood from the following detailed description of a preferred embodiment of the invention with reference to the drawings, in which.

DETAILED DESCRIPTION OF THE PREFERRED EMBODIMENT OF THE INVENTION

Figure 1:
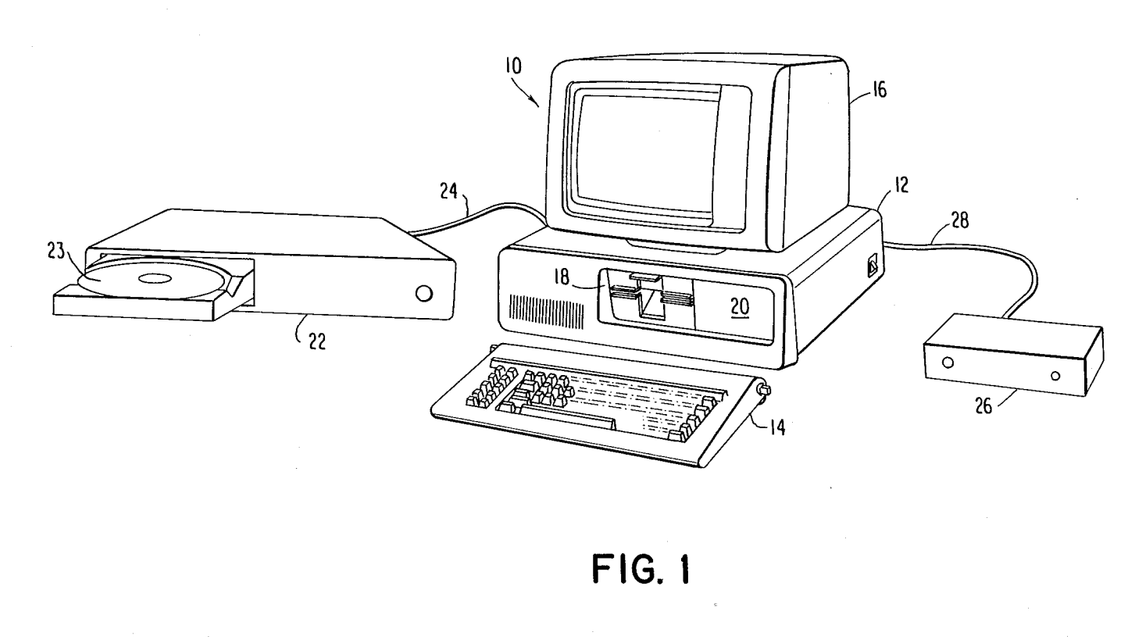
FIG. 1 a pictorial illustration of a personal computer having attached to it a CD ROM and an IR transceiver.

In the drawings, like reference numerals in the several drawing figures refer to the same devices or components. Referring now to the drawings, and more particularly to FIG. 1, there is shown a personal computer 10 comprising a system unit 12, a keyboard 14 and a monitor or display 16. Personal computers of this type are of the so-called open architecture whereby various adapter cards can be inserted in the system unit 12 to support various functions. For example, the system unit shown has within its housing a floppy diskette drive 18 and a fixed are hard disk drive 20. These two drives are used to store program code and data on magnetic media and they are connected to adapter cards (not shown) that interface the drives to the system board (also not shown) in a manner which is now well known in the art.

Connected to the personal computer 10 is a CD ROM drive 22 which accesses data on a CD 23 under control of PC 10. This drive may be of any compatible commercial manufacture and is also supported by an adapter card (not shown) which interfaces the CD ROM drive to the system board. Connection between the CD ROM drive 22 and its adapter card is via a cable 24 provided for that purpose. Also connected to computer 10 is an IR transceiver 26 which is connected to a serial port (RS232 or equivalent) of the system board in system unit 12 via a cable 28. The serial port is an input/output (I/O) port that both sends and receives data. The function of the IR transceiver 26 to encode data from the personal computer and transmit the data as IR signals and to decode received IR signals and output data to the personal computer 10. There are certain handshaking protocols between the personal computer 10 and the IR transceiver 26 as well as encoding and decoding protocols within the IR transceiver 26, but these are well understood in the art and form no part of the present invention.

Figure 2A:
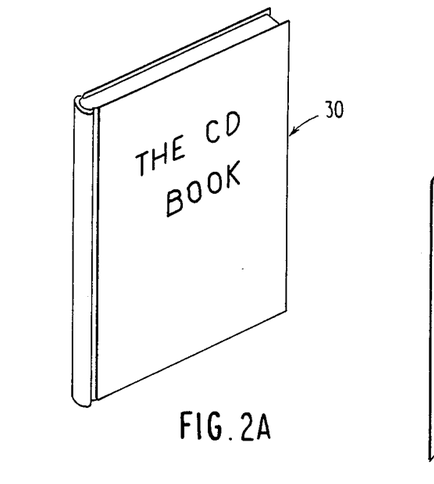
FIG. 2A is a pictorial illustration of the CD book with an optional cover closed.
Figure 2B:
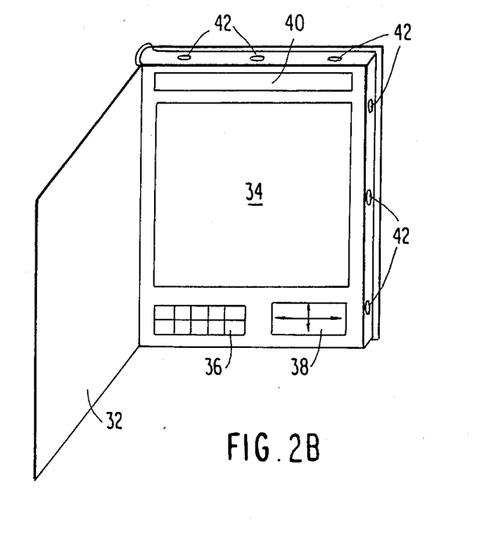
FIG. 2B is a pictorial illustration of the CD book with the cover open.

The transceiver 26 is specifically designed to communicate with a CD book as shown in FIGS. 2A and 2B. As shown in FIG. 2A, the CD book 30 looks like an ordinary book which may be handled and shelved like an ordinary book. However, as shown in FIG. 2B, when the cover 32 of the book is opened, there is revealed a display screen 34, a ten key keypad 36 and a tactile pad switch 38. Above the display screen 34 is a row of solar cells 40, and about the periphery of the book are a plurality of IR LEDs and photodiodes 42.

The keypad 36 allows the user to input a desired page number for display. While only ten keys are illustrated in the basic embodiment, a twelve key keypad having # and * keys, much like a dual tone, multiple frequency (DTMF) telephone keypad may be used to support other functions, such as interactive commands to the PC 10. The tactile pad switch 38 is sensitive to four directions of thumb or finger movement. A movement to the left is effective to turn the page of the book to the next page, not unlike the finger movement required to turn a page of a conventional book. A movement to the right is effective to turn the page back one page. Movements up and down are effective to scroll the display up and down. These latter movements are required where the display screen 34 is not large enough to display a full page but only, for example, twenty-four or twenty-five lines.

What has been described is but one preferred embodiment using "hard" switches comprising the keypad 36 and the tactile pad switch 38. While these switches represent a relatively small number of switches, it is generally believed that where possible switches and/or switch functions should be eliminated since switches generally tend to intimidate the uninitiated user. The tactile switch 38 is specifically designed to provide a friendly user interface, but it might be improved simply by eliminating the need to scroll the display. Scrolling is, after all, alien to how a book is normally read. This can be accomplished by simply displaying a single page, and here what constitutes a single page may be more a definition in software than how the data is arbitrarily stored in the mass storage device. The keypad 36 has functions analogous to other keyed devices around the home, a telephone keypad being but one example, and therefore it should be familiar to most users. Nevertheless, a desirable alternative to the "hard" switches represented by the keypad 36 and the tactile pad switch 38 are so-called "soft" switches. In this application, the implementation of "soft" switches requires a touch sensitive screen 34 wherein programmable areas of the screen may at different times represent different options which may be selected by the user. The implementation of such "soft" switches is a matter of programming and well understood in the art. By the use of "soft" switches, both the keypad 36 and the tactile pad switch 38 can be completely eliminated.

The display screen 34 may be an LCD screen and, in order to maximize the amount of light collected for recharging the interval battery, the solar cells 40 may actually be disposed beneath the transparent LCD and have an area commensurate with that of the screen 34.

The IR LEDs and photodiodes 42 are positioned so that the position and angle of the CD book 30 are not critical to the transmission and reception of signals to and from the IR transceiver 26 attached to the personal computer 10.

Figure 3:
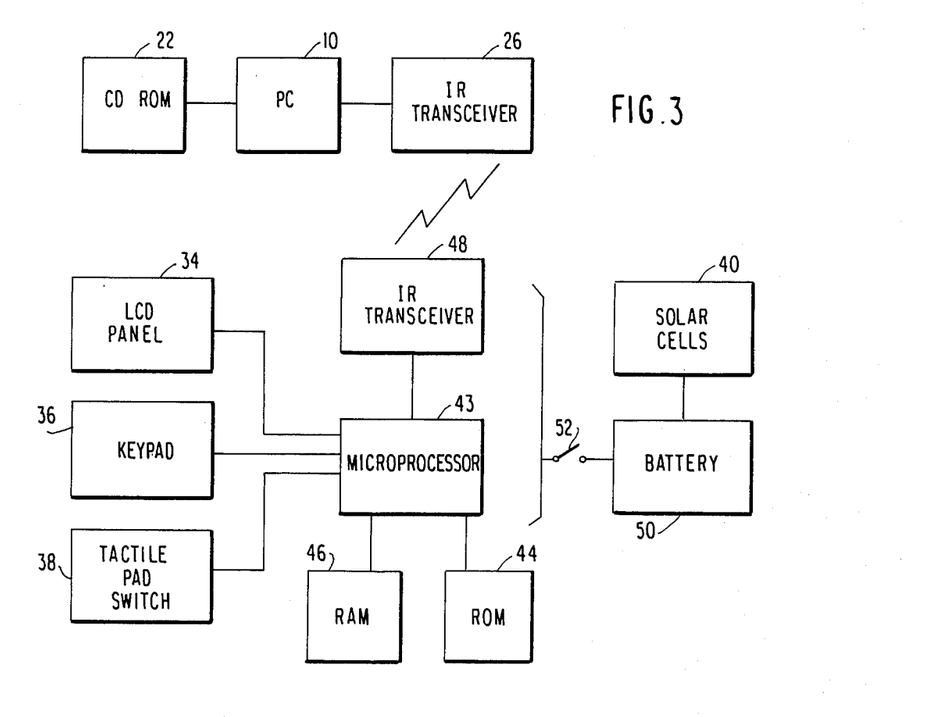
FIG. 3 is a block diagram of the overall system including the PC and CD book.

FIG. 3 shows the overall block diagram of the system including the personal computer 10 and the CD book 30. More specifically, the personal computer 10 is connected to the CD ROM drive 22 via an adapter as previously described. The personal computer is programmed to access data from the CD ROM drive in a manner well known in the art. The program may reside, for example, on the hard disk 20. The IR transceiver 26 is connected to the serial I/O port of the personal computer and provides a wireless link to the CD book.

The CD book comprises a microprocessor 43 supported by both read only memory (ROM) 44 and random access memory (RAM) 46. The program for the microprocessor 43 is stored in the ROM 44, while data transmitted to the CD book for viewing by the user is stored in the RAM 46. There is sufficient RAM for storing approximately twenty pages. The data in RAM 46 is received by an IR transceiver 48 and supplied to the microprocessor 43 which then write the data into the RAM 46. The data in RAM 46 is volatile; that is, if the power is turned off, the data is lost. In addition, the operation of writing into RAM writes over old data so that the old data is lost.

The user input to the microprocessor 43 is provided by the keypad 36 and tactile pad switch 38 and, depending on the input, the microprocessor 43 will display a page by outputting data to the LCD panel 34. If the page requested is not currently in RAM 46, the microprocessor 43 causes the IR transceiver 48 to transmit a request to the personal computer 10 via the IR transceiver 26 to access the CD ROM drive 22 to retrieve the required data and transmit it to the CD book.

The entire CD book 30 is powered by a battery 50. The battery 50 is, in the preferred embodiment, recharged by the solar cells 40. Of course, the battery may be rechargeable by a separate recharger in lieu of or in addition to the solar cells 40. For example, the CD book 30 could be provided with an electrical receptacle which would conveniently mate with a recharger when the CD book is replaced on a book shelf. Obviously, it is not necessary for the practice of the invention for the battery 50 to be rechargeable, and it could simply be a replaceable battery. The battery 50 is shown connected to the circuitry of the CD book via a switch 52. This switch is merely illustrative and need not be a manually operated switch but may be an electronic switch activated by the microprocessor 43 or a combination of a mechanical switch and an electronic switch. For example, the switch 52 may be an input to the microprocessor 43 which is generated by the opening and closing of the cover 32. Then depending on the user input, the power may be totally turned off or merely reduced to a quiescent level when the cover is closed. In the latter case, the user could load twenty pages into RAM 46 for later viewing and indicate to the microprocessor 43 that the data is to be saved. Power from the battery 50 would then be reduced to a level which is sufficient to maintain the data stored in the RAM 46 but not support other functions, thereby conserving battery power. In this state, the user can remove the CD book 30 from the proximity of the personal computer 10 for remote viewing of the data. For example, if the user is going on a business trip and wants to review a document while on an airplane, this can be easily done. It will be readily apparent that other implementations of the switch 52 can be utilized as, for example, a switch which is operable when the CD book is positioned vertically for re-shelving.

While the description thus far has focused on a single user, the invention has other advantages in the environment of presentations and education. In this particular environment, a single personal computer 10 can support a plurality of CD books 30. Thus, a presenter or instructor can lecture an assembled group, and each member of the group can follow the lecture with their own CD book. The advantages will be readily apparent to those engaged in such activities.

Figure 4:
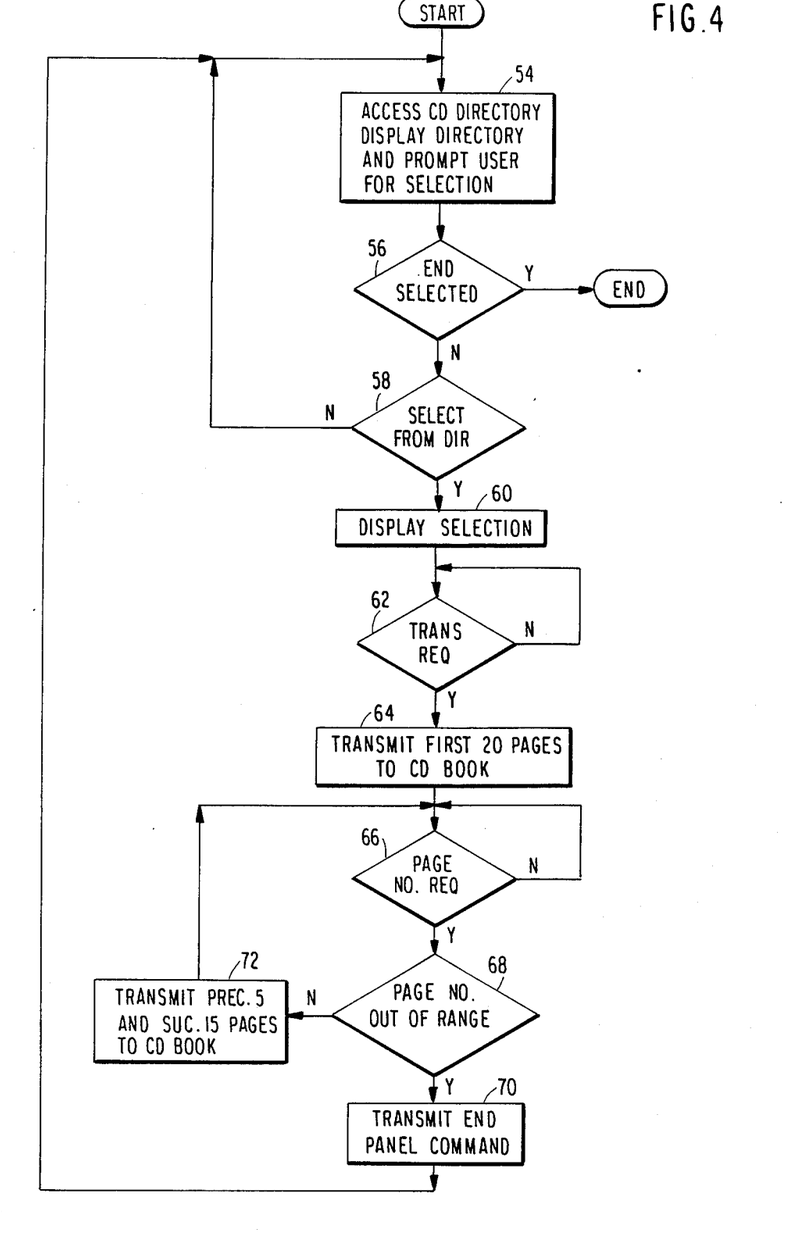
FIG. 4 is a flow diagram of the program for the PC.
Figure 5:
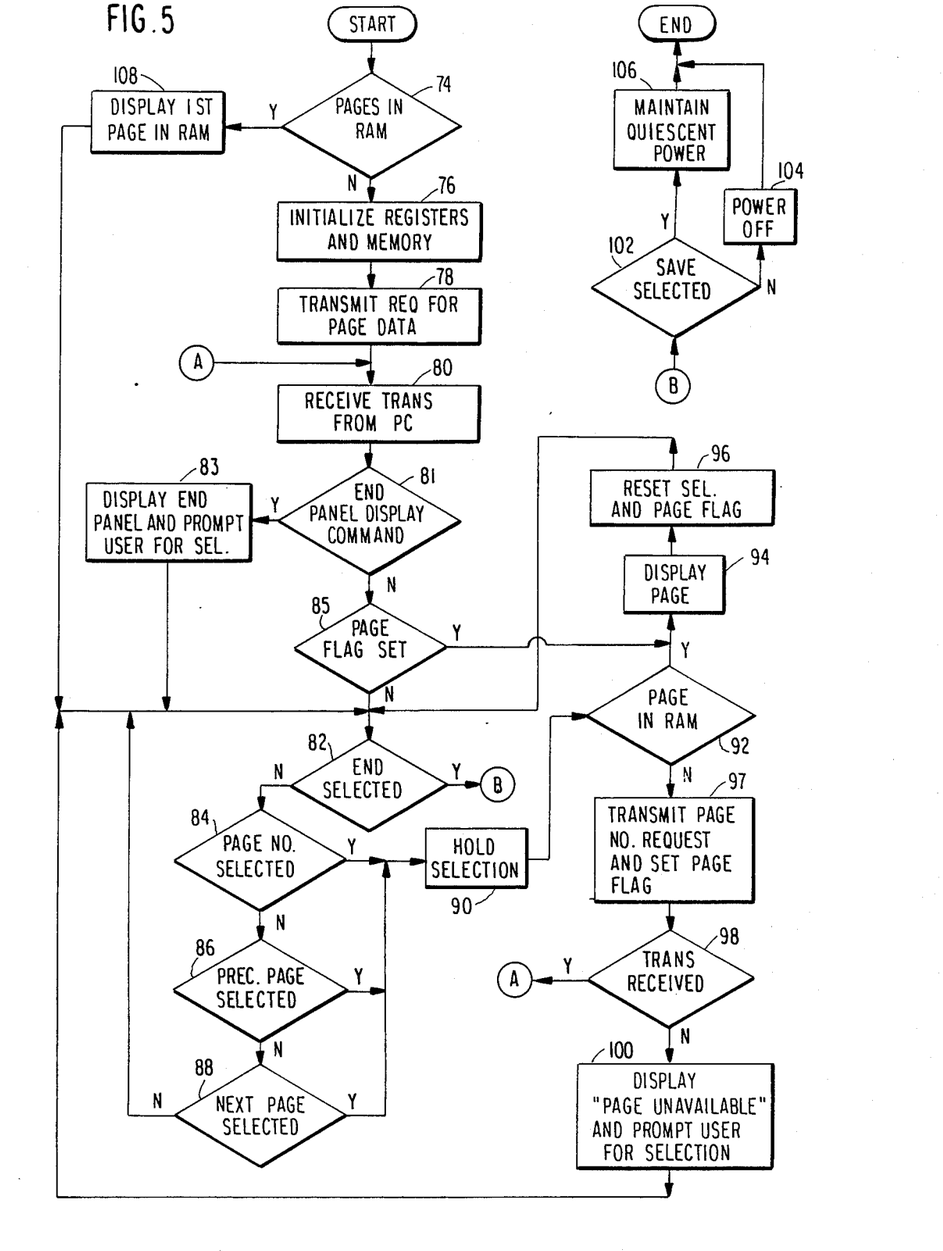
FIG. 5 is a flow diagram of the program for the CD book.

The programs which support these functions are shown in FIGS. 4 and 5, respectively, for the personal computer 10 and the CD book 30. Turning first to the personal computer program, there is shown in FIG. 4 a flow diagram of the logic of the program from which a computer programmer of ordinary skill in the art can readily write source code in a computer language supported by the personal computer 10. The process begins in function block 54 by the personal computer 10 accessing the CD directory of the CD 23 in the CD ROM drive 22. The directory of the CD 23 is displayed on the monitor or display 16 with a prompt for the user to make a selection of the portion of the CD 23 which is to be accessed. The system presents a series of options to the user, the first of which shown in the flow diagram by decision block 56 is the option to end the session. If that option is selected, the session ends; however, it will be assumed that the user makes another selection.

The next selection shown in decision block 58 is a selection from the displayed directory. There may be other selections, but for the purposes of this description it will be assumed that if a selection is not made from the directory, control of the process loops back to function block 54. Assuming that a selection has been made from the directory, the first page of the selection is displayed on the monitor or display 16, as indicated in function block 60.

The process thus far described is conventional in accessing and displaying data from a CD ROM on a personal computer, and there may be other functions supported in the basic system. Such other functions, however, form no part of the present invention. According to the invention, the system waits to determine if the user has requested that data from the CD ROM 22 be transmitted to a CD book or books 30. This is determined by the test in decision block 62 which monitors the appropriate interrupt request from the IR transceiver 26. When the request is detected, the first twenty pages from the section selected in the directory is transmitted to the CD book 30, as indicated in function block 64.

At this point, the RAM 46 in CD book 30 has been loaded with the first twenty pages of the selection, and no further user interaction is required with the personal computer 10. However, there remains the IR link between the personal computer 10 and the CD book 30, and user interaction with the book will cause transmissions to the personal computer. Specifically, there are two actions which the user may take using the CD book: selecting a page number and paging back and forth between pages. The selection of a page number will result in a transmission of a page number request from the CD book 30 to the personal computer 10. This request is detected by decision block 66. When the request is received, a test is made in decision block 68 to determine if the page number requested is out of range. If it is, an end panel is transmitted in function block 70, control returns to function block 54 necessitating the user to make a new selection or end the session at the personal computer 10. On the other hand, if the page number is in range, the preceding five pages and the succeeding fifteen pages are transmitted to the CD book in function block 72, and control returns to decision block 66. By transmitting the preceding five pages, the user with the CD book 30 can page backward a limited number of pages as well as page forward. It will, of course, be understood that the number of pages transmitted will depend on whether those pages exist. For example, if there exist only twelve pages following the page number selected, then only those twelve pages are transmitted.

As mentioned, the user of the CD book 30 can specifically enter a page number or can page back and forth. If in paging through a selection, the user comes to the last page in RAM 46 and attempts to page to the next page, this is detected by the microprocessor program in the CD book 30 which then transmits a page number request for the next page to the personal computer 10. In other words, the personal computer 10 does not know if the page number request detected in decision block 66 is as a result of the user of the CD book 30 entering a specific page number on the keypad 36 or paging to the next page beyond that stored in memory using the tactile pad switch 38.

It is also possible to modify the program so that page number request is transmitted prior to the user reaching the last page currently stored in RAM 46. Consider, for example, a transmission which is initiated, say, five pages before the last page or even every page after a certain number of pages have been displayed. The choice is more a matter of practical implementation and would depend on whether there is a perceptible delay in transmitting data via the IR link and loading the RAM 46. This in turn is dependent on the baud rates at which the data can be transmitted and the speed of the microprocessor 43 and RAM 46. The choice is, therefore, one of design and will vary from one implementation to another.

Turning now to FIG. 5, there is shown the flow chart for the program of the microprocessor 43 in the CD book 30. This flow chart shows the logic of the program in sufficient detail for a programmer of ordinary skill to write source code in the assembly language of the microprocessor used in the CD book. When the CD book 30 is initially turned on, as by opening the cover 32, the microprocessor 43 first makes a test to determine if there are any pages currently residing in RAM 46. This test is made in decision block 74 and is accomplished by checking a memory flag that would be set when pages in RAM 46 are saved, as will be described in more detail hereinafter. If there are no pages in RAM 46, the microprocessor registers and the RAM 46 are initialized in function block 76, and then a request for transmission of the first twenty pages of a selection is transmitted to the personal computer 10 in function block 78. In other words, the user of the CD book 30 would first make a selection from the CD directory displayed on the monitor 16 of the personal computer 10 and then open the cover 32 of the CD book 30 to load the RAM 46 with the first twenty pages of the selection.

The transmission from the personal computer 10 is received in function block 80, and then, skipping to decision block 82, a series of tests are made to determine user input. The first test is in decision block 82 to determine if the user has selected to end the session. Assuming for the time being that the user does not select to end the session, the next test made in decision block 84 is to determine if the user selects a page number using the keypad 36. If not, a test is made in decision block 86 to determine if the user has selected a preceding page. If not, a test is made in decision block 88 to determine if the user has selected a succeeding page. If not, control returns to decision block 82, and so on.

If any of the tests in decision blocks 84, 86 or 88 are positive, the next page number to be displayed is temporarily stored in a register in function block 90, and then a test is made in decision block 92 to determine if that page number is in RAM 46. If it is, the page is displayed in function block 94 and the page number is erased from the temporary register in function block 96 before control returns to decision block 82. On the other hand, if the page is not in RAM 46, the page number in the temporary register is transmitted to the personal computer as a page number request and a page flag is set in function block 97. The microprocessor 43 then waits for a predetermined period of time to receive a transmission from the personal computer, as determined by the test in decision block 98, and if no transmission is received within the time period as when the user is not in the proximity of the personal computer 10, a message "PAGE UNAVAILABLE" is displayed and the user is prompted to enter a new page selection in function block 100 before control returns to decision block 84. On the other hand, if a transmission is received from the personal computer 10 within the timeout period, then control returns to function block 80.

When the transmission is received from the personal computer 10 and the transmission decoded and read into RAM 46, a test is made in decision block 81 to determine if the transmitted data was an end panel display command, indicating that there are no more pages in the current selection. If that command is detected, the end panel is displayed and the user is prompted to select another page number or end the session in function block 83 before control returns to decision block 84. If the end panel command is not received, the process continues as before.

On this time through the loop, a test made in decision block 85 is positive; that is, there is a page number in the temporary register as indicated by the page flag being set in function block 97. As a result, control goes directly to function block 94 where the page requested is displayed.

Assuming now that the user wants to end the session. This is detected in decision block 82. The user is then prompted to indicate if the data currently in RAM 46 is to be saved. The user's selection is determined in decision block 102. If the data is not to be saved, then the power supply is conditioned to turn off the power to the RAM 46 when the cover 32 of the CD book 30 is closed in function block 104. On the other hand, if the user selects to save the data in the RAM 46, the power supply is conditioned to maintain quiescent power to the RAM 46 when the cover 32 is closed in function block 106, thereby maintaining the data in the RAM 46 until the user desires to access the data once again. Now, when the cover 32 of the CD book 30 is again opened and power fully restored and the page flag is detected in decision block 74, the first page of the data in the RAM 46 is displayed in function block 108 before control goes to decision block 84. Thus, it will be appreciated that the user can load the RAM 46 and take the CD book 30 away from the proximity of the personal computer 10 for later access of the data.

The description has concentrated on a single CD book interacting with a personal computer, but as mentioned earlier, it is possible for a plurality of CD books to interact with a single personal computer as in a presentation or education type of environment. In this case, each CD book is identified by a unique code number, and this code number is transmitted as a prefix to any transmission to the personal computer. The personal computer, in turn, temporarily stores the code number and formats its transmission with the code number as a prefix. In this way, the transmission requests from the CD books and the responding transmissions to the CD books are identified and properly directed. Depending on the number of CD books, a multitasking/multiuser operating system may be employed on the personal computer in order to efficiently manage the transmissions between the personal computer and the several CD books being supported at one time.

It bears repeating that the invention can be practiced with any mass storage device and is not limited to CD technology. Thus, while the invention has been described in terms of a single preferred embodiment which contemplates both single and multiple user applications, those skilled in the art will recognize that the invention can be practiced with modification within the spirit and scope of the appended claims.

Having thus described my invention, what I claim as novel and desire to secure by Letters Patent is as follows:

1. An interactive user interface device for accessing data from mass storage media means which provides a user with the look and feel of a book, said mass storage media means being connected to computer means programmed to access data from said mass storage media means and said computer means being connected to first transceiver means for encoding and transmitting data to and receiving and decoding commands from said user interface device, said user interface device comprising:
   a book-shaped housing having mounted thereon display screen means for displaying page data and messages, key means for paging back and forth between displayed pages;
   second transceiver means within said housing for receiving and decoding data transmitted by said first transceiver means and for encoding and transmitting commands to said first transceiver means;
   memory means within said housing for storing a plurality of page data; and
   microprocessor means within said housing and connected to said display screen means, said key means and said second transceiver means, said microprocessor means being programmed for storing data received and decoded by said second transceiver means in said memory means and responsive to said key means for causing page data to be displayed by said display screen means and for causing said second transceiver means to transmit a data request command to said first transceiver means.

2. The user interface device as recited in claim 1 wherein said mass storage media means employs an optical storage media.

3. The user interface device as recited in claim 2 wherein said mass storage media means is a compact disk read only memory.

4. The user interface device as recited in claim 1 wherein said key means is further operable for entering a page number of a page to be displayed.

5. The user interface device as recited in claim 4 wherein said key means comprises a keypad for entering page numbers and tactile pad switch means for paging back and forth between displayed pages.

6. The user interface device as recited in claim 4 wherein said display screen means is a touch screen allowing user input by touching the screen and said key means comprises programmed areas on said screen which allow a user to input choices or selections by touching the screen.

7. The user interface device as recited in claim 1 further comprising power means for supplying electrical power and switch means for connecting said power means to said display screen means, said second transceiver means, said memory means and said microprocessor means.

8. The user interface device as recited in claim 7 wherein said book-shaped housing includes a movable cover which may be opened to reveal said display screen means, said switch means being responsive to said cover being opened or closed.

9. The user interface device as recited in claim 7 wherein said switch means is orientation sensitive and operable when said interface device is in a vertical position, as when placed on a shelf, to disconnect said power means.

10. The user interface device as recited in claim 7 wherein said switch means has a first mode of operation in which said power means is connected to said display screen means, said second transceiver means, said memory means and said microprocessor means, a second mode of operation in which said power means is connected to said memory means for maintaining data stored therein, and a third mode of operation in which said power means is disconnected from said display screen means, said second transceiver means, said memory means and said microprocessor means, said second mode of operation being used to store data for later access out of the range of said first transceiver means.

11. A user interactive mass storage data access system comprising:
   mass storage media means for storing data;
   computer means connected to said mass storage media means and programmed to access said data;

first transceiver means connected to said computer means for encoding and transmitting and receiving data;

a book-shaped housing having mounted thereon a display screen means for displaying page data and messages and key means for paging back and forth between displayed pages;

second transceiver means within said housing for receiving and decoding data transmitted by said first transceiver means and for encoding and transmitting commands to said first transceiver means;

memory means within said housing for storing a plurality of page data; and microprocessor means within said housing and connected to said display screen means, said key means and said second transceiver means, said microprocessor being programmed for storing data received and decoded by said second transceiver means in said memory means and responsive to said key means for causing page data to be displayed by said display screen and for causing said second transceiver means to transmit a data request command to said first transceiver means.

12. The user interactive mass storage data access system recited in claim 11 wherein said mass storage means is a compact disk read only memory device.

13. The user interactive mass storage data access system recited in claim 11 wherein said display means is a touch screen allowing user input by touching the screen and said key means comprises programmed areas on said screen means which allow a user to input choices or selections by touching the screen.

14. The user interactive mass storage data access system as recited in claim 11 further comprising power means in said book-shaped housing for supplying electrical power and switch means for connecting said power means to said display screen means, said second transceiver means, said memory means and said microprocessor means, said book-shaped housing includes a movable cover which may be opened to reveal said display screen means, said switch means being responsive to said cover being opened or closed.

15. The user interactive mass storage data access system recited in claim 14 wherein said switch means has first, second and third modes of operation, power being supplied to said display screen means, said second transceiver means, said memory means and said microprocessor means in said first mode of operation, power being supplied to said memory means in said second mode of operation to maintain data stored therein for later access out of the range of said first transceiver means, and power being turned off in said third mode of operation.

* * * * *